(12) United States Patent
Makino et al.

(10) Patent No.: US 6,549,694 B2
(45) Date of Patent: Apr. 15, 2003

(54) OPTICAL SWITCHING ELEMENT, SWITCHING APPARATUS AND IMAGE DISPLAY APPARATUS USING OPTICAL SWITCHING ELEMENT

(75) Inventors: Takuya Makino, Chiba (JP); Kazuhiro Hane, Miyagi (JP); Kazuhito Hori, Kanagawa (JP); Masaki Hara, Kanagawa (JP); Naoki Sano, Kanagawa (JP); Hidenori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/836,718

(22) Filed: Apr. 17, 2001

(65) Prior Publication Data

US 2002/0006248 A1 Jan. 17, 2002

(30) Foreign Application Priority Data

Apr. 19, 2000 (JP) ........................................ 2000-117599

(51) Int. Cl.[7] ................................................ G02B 6/26
(52) U.S. Cl. ............................ 385/18; 385/19; 385/16; 359/223
(58) Field of Search ............................ 385/15, 18, 115, 385/116, 117, 16, 19; 359/128, 223, 224, 290, 320

(56) References Cited

U.S. PATENT DOCUMENTS 5,452,383 A * 9/1995 Takiguchi ..................... 385/16
5,452,385 A * 9/1995 Izumi et al. ................... 385/37
6,381,381 B1 * 4/2002 Takeda et al. ................. 385/16

* cited by examiner

Primary Examiner—Robert H. Kim
Assistant Examiner—Therese Barber
(74) Attorney, Agent, or Firm—Frommer Lawrence & Haug LLP; William S. Frommer; Gordon Kessler

(57) ABSTRACT

To provide a small and lightweight optical switching element with a simple structure capable of fast response, and an optical switching apparatus employing the optical switching element. Optical extraction unit contacts an upper substrate with electrostatic attraction generated between a transparent electrode of the optical extraction unit and a transparent electrode of the upper substrate. In the case that light enters one V-shaped trench of the upper substrate vertically, the light enters the optical extraction unit of the upper substrate and is emitted from a back of the optical extraction unit (a tapered unit). Subsequently, the incident light $P_1$ passes through a lower substrate and is converted into transmission light. With electrostatic attraction generated between a transparent electrode of the lower substrate and a transparent electrode of the optical extraction unit, the optical extraction unit is attracted to a lower substrate side. In this state, the incident light is caused the total reflection at a total reflection face. This total reflection light is emitted from the other V-shaped trench. The incident light can be switched in two ways: the transmission light and the total reflection light.

21 Claims, 19 Drawing Sheets

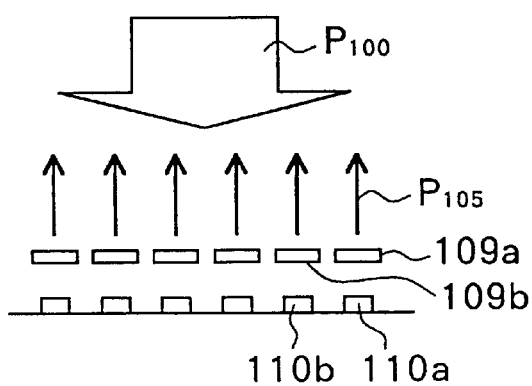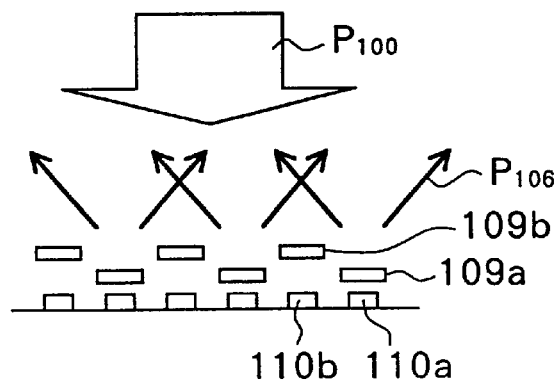
FIG.6A
RELATED ART
FIG.6B
RELATED ART

OPTICAL SWITCHING ELEMENT, SWITCHING APPARATUS AND IMAGE DISPLAY APPARATUS USING OPTICAL SWITCHING ELEMENT

BACKGROUND OF THE INVENTION

1. Field of the Invention

The present invention relates to an optical switching element capable of deflecting incident light in two ways, and an optical switching apparatus and an image display apparatus employing the optical switching element.

2. Description of the Related Art

Recently, a display has been playing an important role as an image device for image information. As an element for the display, and elements for optical communication, an optical storage apparatus, an optical printer, a request for developing an optical switching element achieving fast operation has been increased. Conventionally, as those kinds of the elements, an element employing liquid crystal, an element employing a micromirror, an element employing diffraction grating and so on have been used. An example of the element employing liquid crystal is shown in FIG. 1. An example of the element employing the micromirror is shown in FIGS. 2A to 5. An example of the element employing diffraction grating is shown in FIG. 6.

The optical switching element employing crystal liquid (FIG. 1) is provided with a pair of deflection boards 101a, 101b, a pair of glass substrates 102a, 102b, transparent electrodes 103a, 103b, 103c, 103d, and crystal liquid 104 sealed between the pair of the glass substrates 102a and 102b. In the optical switching element, voltage is applied to the transparent electrodes 103a, 103b, 103c, and 103d to control orientation of crystal liquid molecules and rotate a deflection face, thereby carrying out switching.

However, the liquid crystal has poor fast-response characteristics. Even one having fast response exhibits only a few milli-seconds. For this reason, liquid crystal is considerably difficult to be applied to those optical storage apparatuses, which are required fast response, such as optical communication, optical calculation, optical storage apparatus such as holographic memory, an optical printer and so on. Additionally, in the optical switching element employing the liquid crystal, the pair of the deflection boards are necessary, which decreases effective use of light. Further, the liquid crystal can not resist strong light, so that switching can not be conducted by light having high energy density such as strong laser light. Especially, in the case of using the display, higher quality image is required. However, in the current optical switching element employing the liquid crystal, disadvantages such as inaccuracy in gradation indication begin to appear.

In the optical switching element employing the micromirror, as typified by DMD (digital micromirror device) manufactured by Texas Instruments Incorporated (U.S.), many specific examples have already existed. As its structure, there are two types: one supporting the micromirror with a single hand (FIGS. 2A, 2B, and 3), and the other supporting the micromirror with two hands (FIGS. 4A, 4B and 5). As a method for driving the micromirror, there are a method using electrostatic attraction, a method using piezoelectric elements, a method using thermo actuator and so on. Although there are differences in the structure, the method for driving and so on, as its function, switching of incident light is performed by controlling the angle of the micromirror, which is rather simple.

Here, the micromirror using the electrostatic attraction will be described as an example. As the driving principle of the micromirror, the case where the micromirror is supported with the single hand (FIGS. 2A, 2B and 3) is as follows; Potential difference is given between a micromirror 105 and a driving electrode 106, which generates electrostatic attraction to incline the micromirror 105. When the given potential difference is eliminated, the previous condition gets back by spring strength of a hinge 105a supporting the micromirror 105.

In the case where the micromirror is supported with two hands (FIGS. 4A, 4B, and 5), the same potential difference is generated between the micromirror 108 and a pair of electrodes 107a, 107b oppose to the micromirror 108. Under this condition, for example, voltage applied to the electrode 107a becomes low, on the other hand, voltage applied to the electrode 107b becomes high, which occurs unbalance in electrostatic attraction generated between the electrodes 107a, 107b and the micromirror 108 respectively, thereby inclining the micromirror 108.

The light is switched based on the following conditions. In the case of the micromirror supported with the single hand (FIGS. 2A, 2B, and 3), under a condition where the micromirror 105 is not inclined with respect to incident light $P_{100}$, reflection light advances in a $P_{101}$ direction, on the other hand, in a condition where the micromirror 105 is inclined with respect to the incident light $P_{100}$, the reflection light advances in a $P_{102}$ direction. In the case of the micromirror supported with two hands (FIGS. 4A, 4B, and 5) as the same manner, under a condition where the micromirror 108 is inclined in one direction with respect to the incident light Ploo, the reflection light advances in a $P_{103}$ direction, on the other hand, under a condition where the micromirror 108 is inclined in the other direction, the reflection light advances in a $P_{104}$ direction.

However, response speed of the above-mentioned switching is a few micro-seconds in many cases, which is not enough to achieve fast switching. In the optical switching element employing the micromirror, an angle capable of deflecting light (angle difference between two of the reflection light is twice as large as a mechanical mirror angle of deviation). However, in the case where the optical switching element is used for the display, for obtaining high contrast, angle differences between the two reflection light $P_{103}$ and $P_{104}$ must be wider, thereby the response speed becomes slower.

In the optical switching element employing diffraction grating (FIGS. 6A and 6B), as disclosed in Translated National publication of Patent Application No. Hei 10-510374, with electrostatic attraction caused by potential difference between a movable mirror 109a and a lower electrode 110a, a ribbon-like movable mirror having a light reflection face moves in a quarter wavelength of the incident light $P_{100}$. This produces an optical path difference in a half wavelength between a ribbon-like static mirror 109b and the movable mirror 109a, thereby generating diffraction light, and then the reflection light is switched between a zero diffraction light $P_{105}$ direction and a linear diffraction light $P_{106}$ direction. At this moment, with the reason that the optical path difference is controlled within a half wavelength, intensity of the linear diffraction light $P_{106}$ can be controlled. In the optical switching element employing diffraction grating, only the extremely lightweight ribbon-like mirror is moved in a small distance, which can perform switching of the light, therefore, its response is fast. For this reason, the optical switching element employing diffraction grating is suitable for the fast switching.

However, for generating light diffraction, at least the two ribbon-like mirrors are necessary, and for enhancing effective use of the light, the four mirrors or more are necessary, specifically, the six ribbon-like mirrors are necessary. For this reason, in the case of using the ribbon-like mirrors arranged in linear, a whole size is difficult to be realized miniaturization. The linear diffraction light is generated with certain angles in two directions symmetrical with respect to the optical axis of the zero diffraction light. Therefore, for using the linear diffraction light, this requires a complicated optical system used for converging the above-mentioned light, advancing in two directions, into single light. Ideally, the reflection face of the static mirror 109b and the reflection face of the movable mirror 109a must be positioned on the same plane in a condition where voltage is not applied to the electrode. However, substantially, those reflection faces are not positioned on the same plane in good accuracy. For this reason, by applying small voltage to the lower electrodes 110a and 110b, fine adjustment is respectively required to perform in order that the all reflection faces are positioned on the same plane.

Other and further objects, features and advantages of the invention will appear more fully from the following description.

SUMMARY OF THE INVENTION

The invention has been achieved in consideration of the above problems and its first object is to provide a small and lightweight optical switching element with a simple structure capable of fast response, and an optical switching apparatus employing the optical switching element.

Further, its second object is to provide an image display apparatus capable of high accuracy in gradation indication with the above-mentioned optical switching element, and of high quality image and miniaturization.

The optical switching element according to the present invention is provided with a total reflection member having a total reflection face capable of causing the total reflection of incident light, and a translucent optical extraction unit capable of switching in either a first position or a second position, wherein the first position is a position where the optical extraction unit contacts the total reflection face of the total reflection member or a position where the optical extraction unit is disposed closed to the total reflection face with an interval small enough to extract near-field light and the second position is a position where the optical extraction unit is disposed with an interval greater than the interval with which the near-field light is extracted.

The optical switching apparatus according to the present invention is arranged a plurality of the optical switching elements of the present invention in linear or two dimensional.

The image display apparatus according to the present invention displays two-dimensional image by arranging a plurality of the optical switching elements of the present invention, irradiating three-primary colors and scanning with a scanner.

In the optical switching element, the optical switching apparatus and the image display apparatus according to the present invention, when an optical extraction unit is in a second position, with a reason that a total reflection member is apart from the translucent optical unit, incident light entering the total reflection unit is caused total reflection in a total reflection face, its reflection light is guided to one direction. When the optical extraction unit is a first position, with a reason that the optical extraction unit contacts the total reflection member or is disposed close to the total reflection member, the incident light entering the total reflection member is not caused the total reflection in the total reflection face, and is guided to a direction oppose to the total reflection member via the optical extraction unit. In connection with this, "the optical extraction is disposed close to a distance with an interval small enough to extract near-field light" means a distance in which the incident light can be extracted substantially without completely contacting the optical extraction unit to the total reflection member. In addition, if the optical extraction unit is disposed close to the total reflection member up to a distance of a one-fortieth wavelength ($\lambda$) of the incident light, equal to or more than 90% of the incident light can be extracted.

BRIEF DESCRIPTION OF THE DRAWINGS

These and other objects and features of the present invention will become clear from the following description of the preferred embodiments given with reference to the accompanying drawings, in which:

FIG. 6 is a view describing an effect of an optical switching element employing a conventional diffraction grating;

DETAILED DESCRIPTION OF THE PREFERRED EMBODIMENTS

Figure 1:
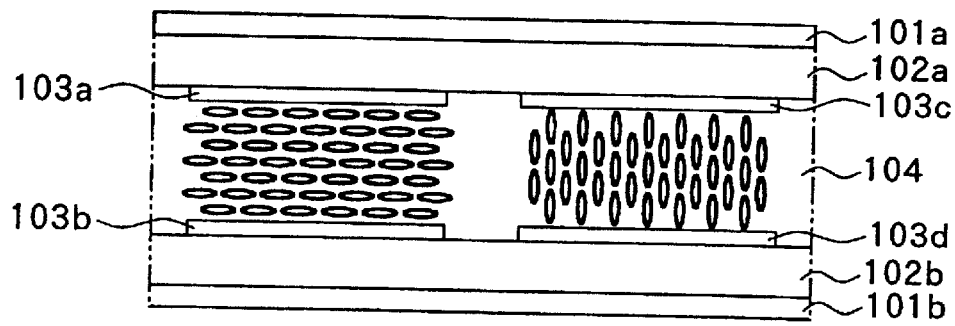
FIG. 1 is a view showing a structure of an optical switching element employing conventional liquid crystal.
Figure 2A:
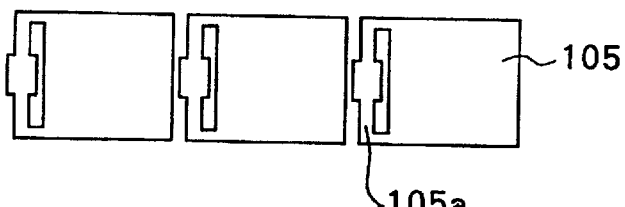
FIGS. 2A and 2B are views showing a structure of an optical switching element employing a conventional micromirror (a single hand method)
Figure 2B:
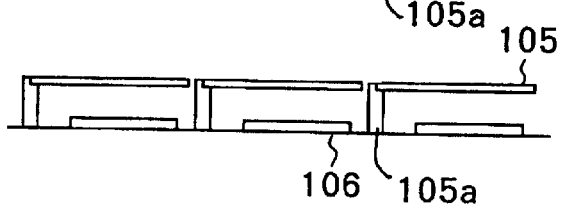
Figure 3:
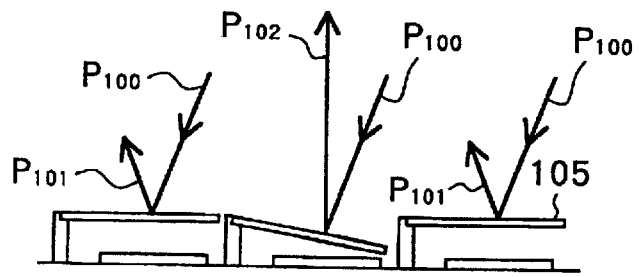
FIG. 3 is a view describing an effect of the optical switching element in FIG. 2.
Figure 4A:
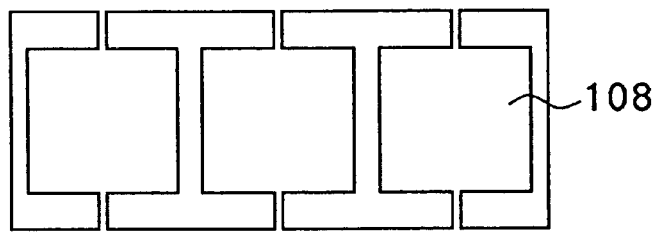
FIGS. 4A and 4B are views showing a structure of an optical switching element employing a conventional micromirror (a two-hand method)
Figure 4B:
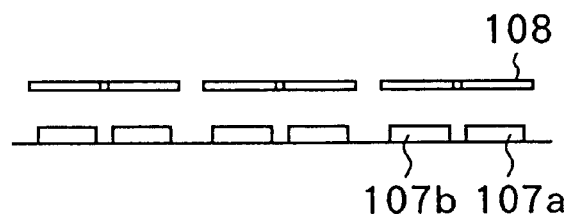
Figure 5:
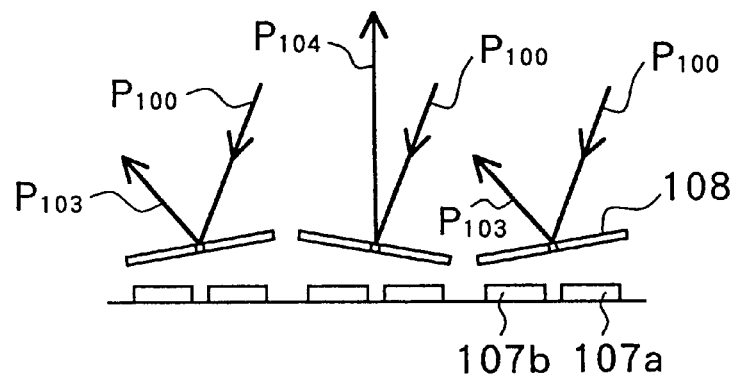
FIG. 5 is a view describing an effect of the optical switching element in FIG. 4.

Embodiments of the invention will be described in detail hereinbelow by referring to the drawings.

Figure 7:
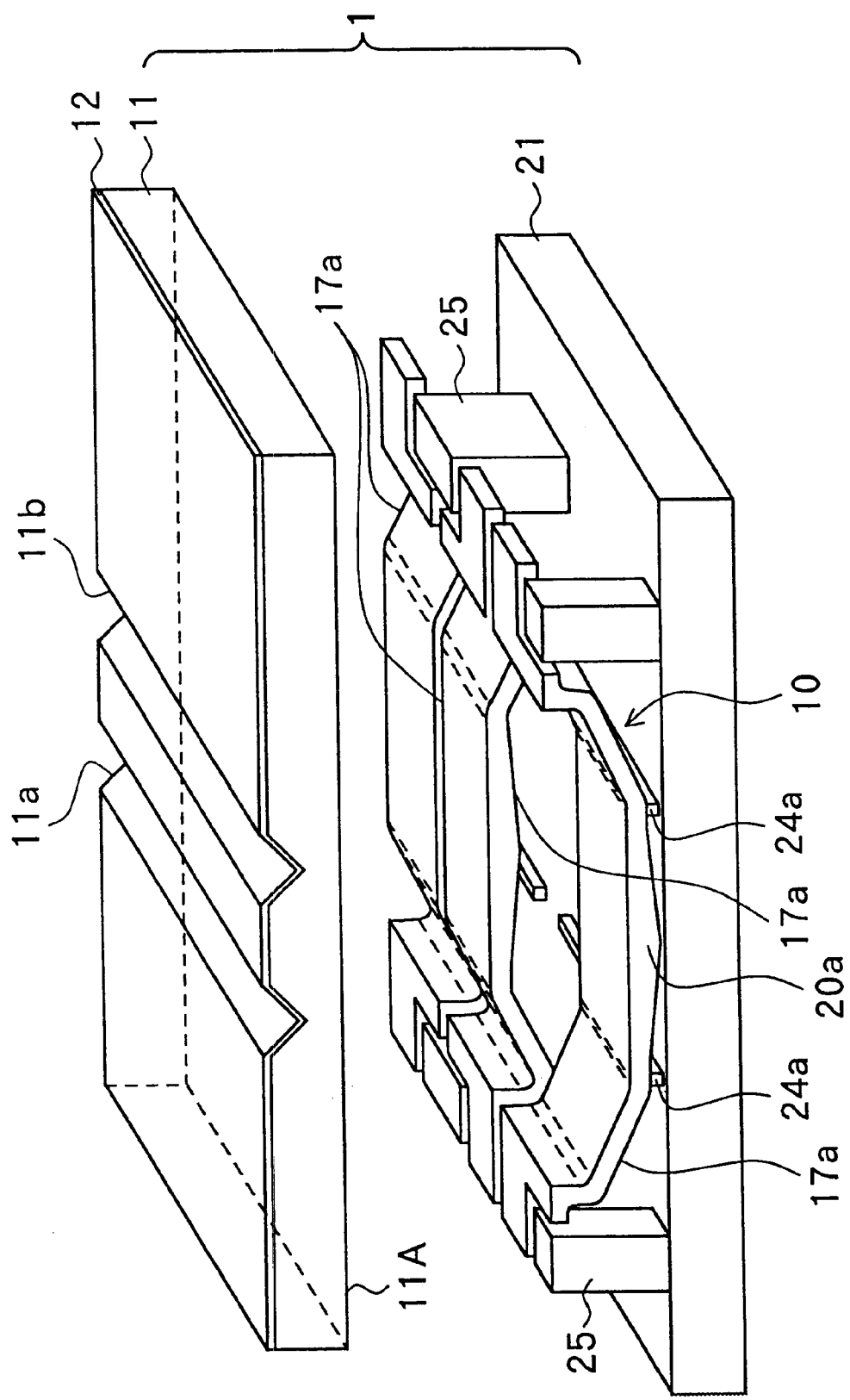
FIG. 7 is a perspective view showing a configuration of an optical switching apparatus relative to an embodiment of the present invention.

FIG. 7 is a view showing a whole structure of an optical switching apparatus relative to an embodiment of the present invention. The optical switching apparatus 1 has a linear structure including a plurality of optical switching elements 10 (ex. FIG. 7 is illustrated three optical switching elements 10) of the present invention.

The optical switching apparatus 1 is provided with a translucent upper substrate 11 and a translucent lower substrate 21 disposed in a manner to oppose to the upper substrate 11. The upper substrate 11 and lower substrate 21 are respectively translucent substrates made of a glass substrate or transparent plastic substrate, for instance.

The upper substrate 11 has upper and lower faces in parallel. Provided on the upper face are a V-shaped trench 11a, which is an incident part of the light, and a V-shaped trench 11b, which is an emission part of the light. An anti-reflection film 12 made of, for example, magnesium fluoride ($MgF_2$) is formed on the upper face including these V-shaped trenches 11a and 11b thereon. The lower face of the upper substrate 11 is a total reflection face 11A in order to cause total reflection of incident light. Inclined angles of the V-shaped trenches 11a and 11b are critical angles or greater for which the incident light, which enters in a direction orthogonal to the inclined faces, causes total reflection at the total reflection face 11A.

On the total reflection face 11A side of the upper substrate 11, an unillustrated transparent electrode made of ITO (Indium-Tin Oxide: a mixed film of indium-tin oxide). Thin ribbon-like four optical extraction units 17a made of silicon nitride ($SiN_x$) films are also disposed on the total reflection face 11A side of the upper substrate 11, for example. Here, FIG. 1 illustrates the optical extraction units 17a as apart from the upper substrate 11 for the simplification purpose.

The optical extraction units 17a has a bridged structure, in which the both ends of the optical extraction units 17a are supported by the upper substrate 11, and with electrostatic attraction generated by potential difference caused by applying voltage, a middle part of the optical extraction units 17a can be switched in either a first position or a second position—the first position is a position where the optical extraction units 17a contact the total reflection face 11A of the upper substrate 11 or a position where the optical extraction units 17a are disposed closed to the total reflection face 11A with an interval small enough to extract near-field light (a state of the optical extraction units 17a in a back of FIG. 7), and the second position is a position where the optical extraction units 17a are disposed with an interval greater than the interval with which the near-field light is extracted (a state of the optical extraction units 17a in a front of FIG. 1). In addition, a driving means of the present invention is comprised of the transparent electrode formed in the total reflection face 11A of the upper substrate 11 and the optical extraction units 17a respectively, and an unillustrated voltage applying means.

On the lower substrate 21, a plurality of spacers 24a and a plurality of spacers 25 are respectively disposed. The spacers 24a and spacers 25 are made of a silicon nitride film, for example. The spacers 24a functions as a stopper and a support unit when the optical extraction units 17a are switched in the second position, and are disposed in two lines along with an arranged direction of the optical extraction units 17a. The spacers 25 are for keeping a displaceable distance in which the optical extraction units 17a can switch in either the first position or second position in space between the upper substrate 11 and the lower substrate 21.

In the present embodiment, single optical extraction units 17a comprises the one optical switching element 10, a plurality of the optical switching elements 10 comprises the linear optical switching apparatus 1.

Next, a specific method for manufacturing the optical switching apparatus 1 will be explained. Here, manufacturing processes of a linear array structure including the four optical switching elements 10 will be described hereinafter.

Figure 8A:
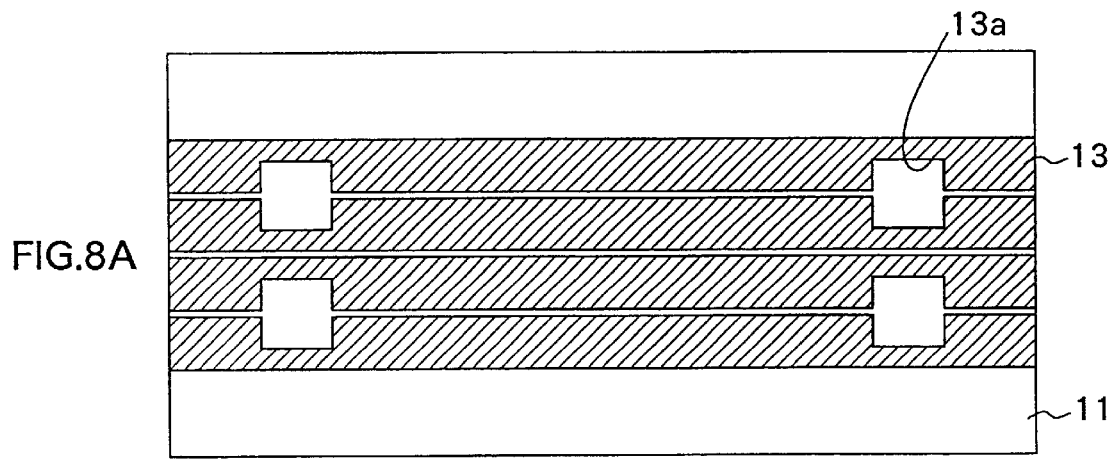
FIGS. 8A and 8B are respectively plain and cross sectional views describing a method for manufacturing the optical switching apparatus in FIG. 7.
Figure 8B:
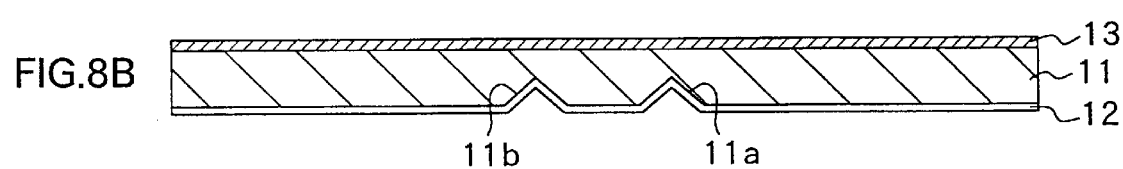

First, as shown in FIGS. 8A and 8B, on the upper face of the upper substrate 11 made of a translucent substrate such as a glass substrate, the V-shaped trench 11a, which is the incident part of light and the V-shaped trench 11b, which is the emission part of light are respectively formed by using physical processing such as etching, or mechanical processing such as grinding. Following this, on the face in which the V-shaped trenches 11a and 11b are formed, the anti reflection film 12 made of e.g. $MgF_2$ is formed with a vacuum evaporation method, for example. Then, on an opposite face (the total reflection face 11A) to the surface, on which V-shaped trenches 11a and 11b are formed on the upper substrate 11, with a CVD (Chemical Vapor Deposition) method, the transparent electrode (e.g. an ITO film) with 50 nm thickness, and a (transparent) insulation film (e.g. a silicon dioxide ($SiO_2$) film) with 30 nm thickness are formed in this order. The stacked film 13 is patterned in an electrode shape with etching. The insulation film functions as a protection film of the transparent electrode (the ITO film).

Figure 9:
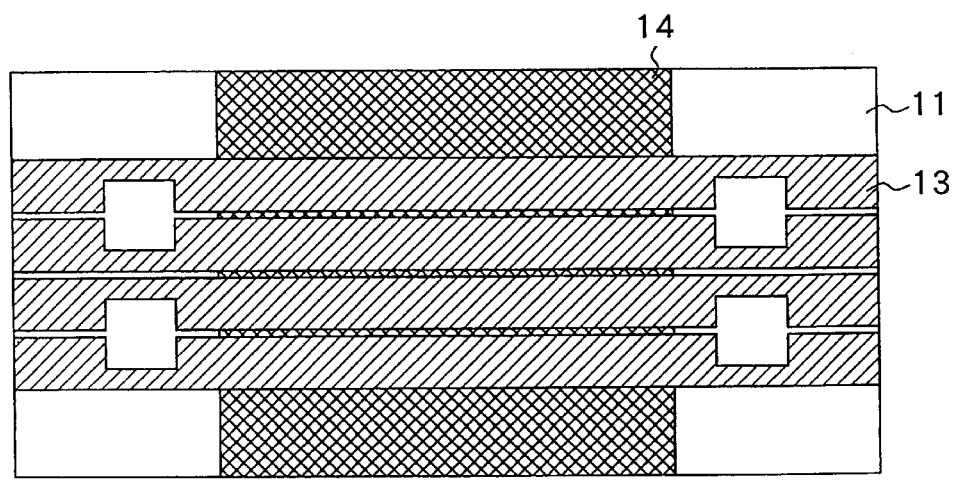
FIG. 9 is a view describing a step following to the step of FIGS. 8A and 8B.
Figure 10:
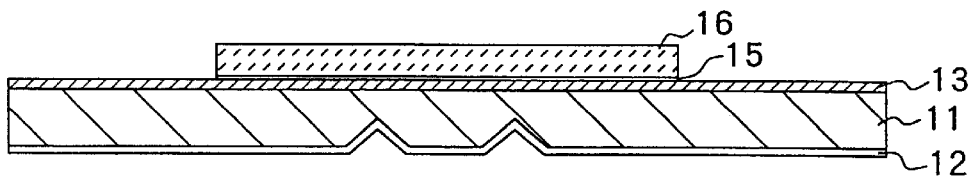
FIG. 10 is a view describing a step following to the step of FIG. 9.

Next, as shown in FIG. 9, absorption layers 14 for absorbing unnecessary light are formed between the electrode patterns in a manner to be thinner than a thickness of an electrode unit with a vacuum evaporation method, for example. Succeedingly, as shown in FIG. 10, an anti-adhesion layer 15 made of, for example, fluoroplastics, having 2 nm thickness is formed. After this, formed on the anti adhesion layer 15 is a sacrificial layer 16 made of, for example, amorphous silicon (a-Si), having 400 nm and patterned in a shape of the optical extraction unit with etching. The anti adhesion layer 15 prevents the ribbon-like optical extraction units 17a, which will be described later, from adhering to the upper substrate 11. The sacrificial layer 16 is for producing the middle part of the optical extraction units 17a in a manner of being a bridged structure apart from the total reflection face 11A in a range of a half wavelength or more.

Figure 11A:
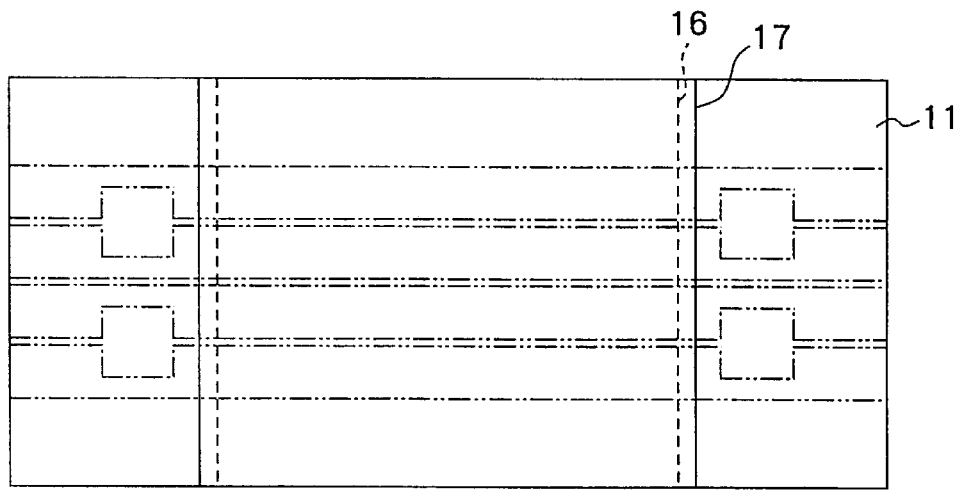
FIGS. 11A and 11B are views describing a step following to the step of FIG. 10.
Figure 11B:
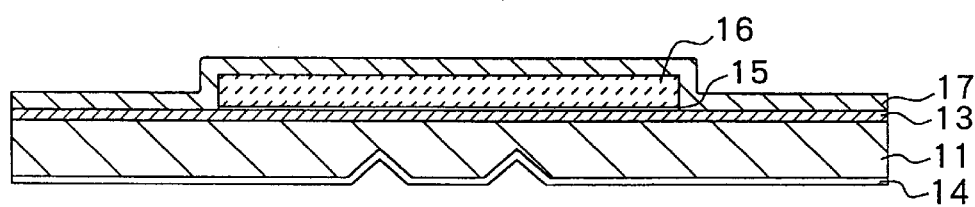
Figure 12:
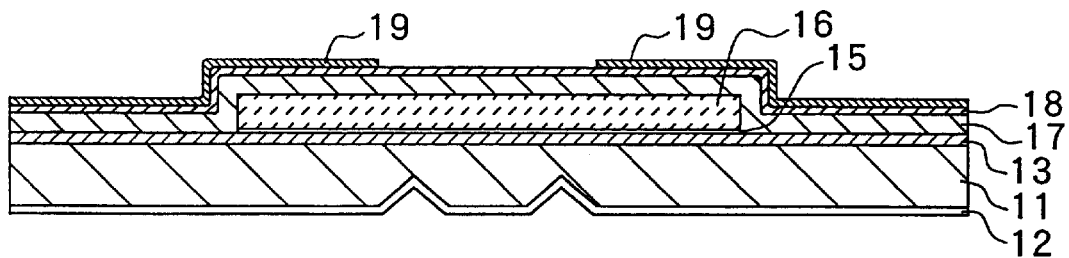
FIG. 12 is a cross sectional view describing a step following to the step of FIGS. 11A and 11B.

As shown in FIGS. 11A and 11B, a silicon nitride film 17 having 100 nm thickness, for example, is formed as a structural material of the optical extraction units 17a with a LPCVD (Low Pressure Chemical Vapor Deposition) method, for example. Then, as shown in FIG. 12, an ITO film 18 having 50 nm thickness, functioning as a transparent driving electrode, is formed, on the ITO film 18, aluminum (Al) films 19 having 20 nm thickness are formed. The aluminum films 19 function as a protection layer of the ITO film 18 when a silicon dioxide ($SiO_2$) film 20, which will be described later, is subjected to a taper processing.

Figure 13:
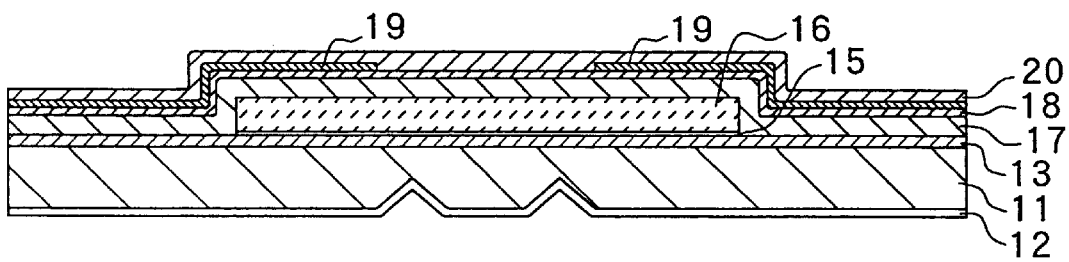
FIG. 13 is a cross sectional view describing a step following to the step of FIG. 12.
Figure 14:
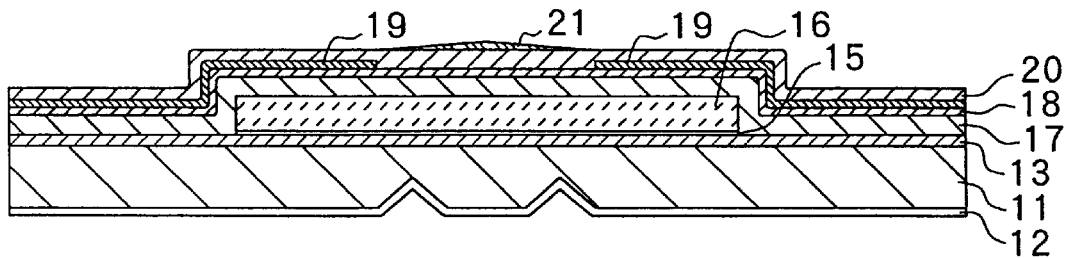
FIG. 14 is a cross sectional view describing a step following to the step of FIG. 13.
Figure 15:
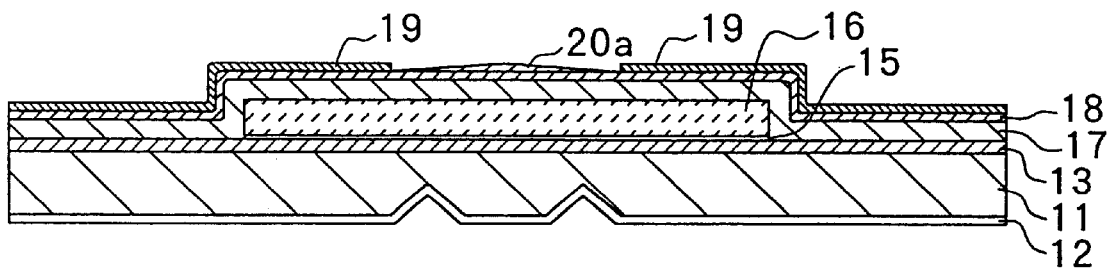
FIG. 15 is a cross sectional view describing a step following to the step of FIG. 14.
Figure 16:
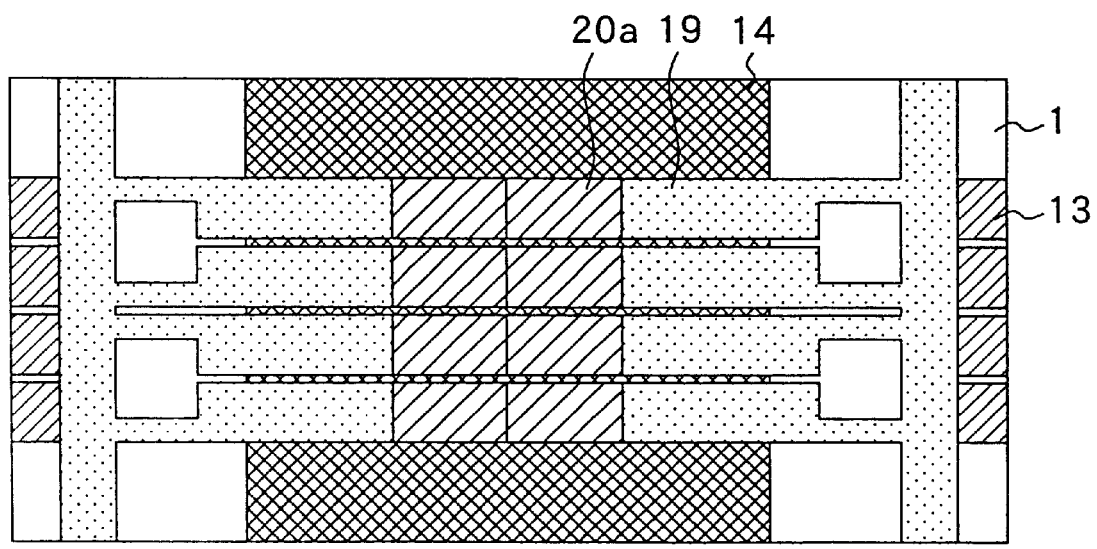
FIG. 16 is a plane view describing a step following to the step of FIG. 15.

Following this, the taper processing is carried out in order to prevent incident light, which enters the optical extraction units 17a, from reflecting on a back of the optical extraction units 17a. For the taper processing, initially, as shown in FIG. 13, the silicon dioxide film 20 having 10 $\mu$m is formed with the LPCVD method. After this, as shown in FIG. 14, a resist film 21 is applied on the silicon dioxide film 20, and then exposed with a gray scale mask so as to process in a taper shape. Then, as shown in FIGS. 15 and 16, a tapered part 20a is formed by selectively removing the silicon dioxide film 20 with RIE (Reactive Ion Etching) with the tapered resist film 21 as a mask.

Figure 17:
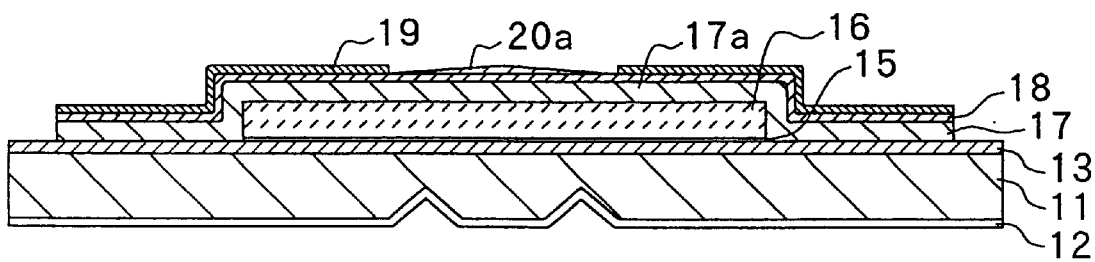
FIG. 17 is a cross sectional view describing a step following to the step of FIG. 16.

As shown in FIG. 17, the sacrificial layer 16 made of amorphous silicon is removed with dry etching employing xenon fluoride ($XeF_2$). This successfully turns the silicon nitride film 17 into the thin ribbon-like optical extraction units 17a having the bridged structure.

Figure 18:
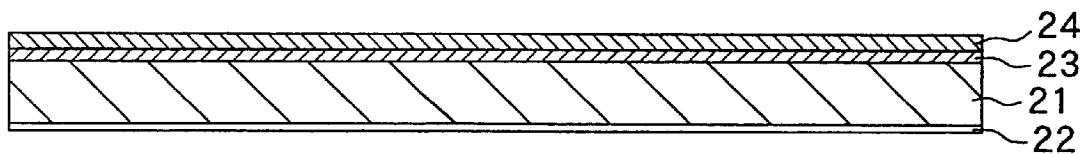
FIG. 18 is a cross sectional view describing a step following to the step of FIG. 17.

Succeedingly, the lower substrate 21 disposed on the side oppose to an incident part of the light is prepared as shown in FIG. 18. On one face of the lower substrate 21, an anti reflection film 22 made of, for example $MgF_2$, for preventing internal reflection is formed. On the face oppose to the anti-reflection film 22, an ITO film functioning as a lower transparent electrode and an insulation layer made of a silicon dioxide ($SiO_2$) film and antireflection film made of, for example, $MgF_2$ are formed in this order, thereby forming a stacked film 23. Further, a polycrystalline silicon film 24 having 1.1 $\mu$m thickness, for example is formed on the stacked film 23 with the LPCVD method, for example.

Figure 19:
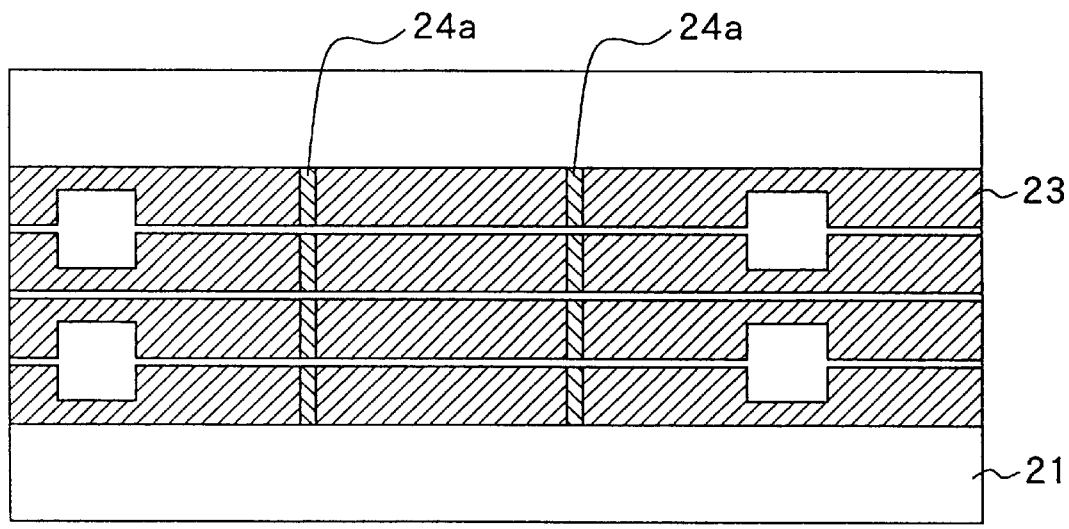
FIG. 19 is a plane view describing a step following to the step of FIG. 18.
Figure 20:
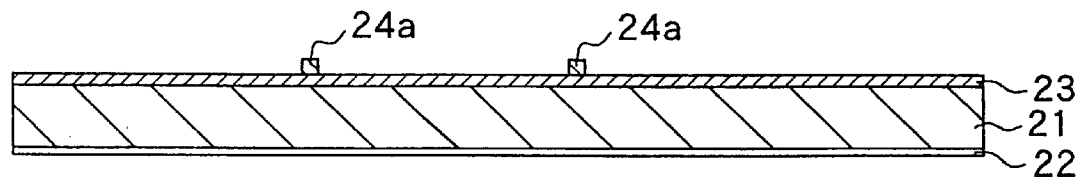
FIG. 20 is a cross sectional view describing a step following to the step of FIG. 19.

Next, as shown in FIGS. 19 and 20, the polycrystalline silicon film 24 is patterned to form the spacers 24a for preventing the optical extraction units 17a formed on the upper substrate 11 side in the previous process from con-tacting the lower transparent electrode (the ITO film) on the lower substrate 21 side. The stacked film 23 is patterned in an electrode shape corresponding to the shape of the optical extraction unit 17a formed in the upper substrate 11.

Figure 21:
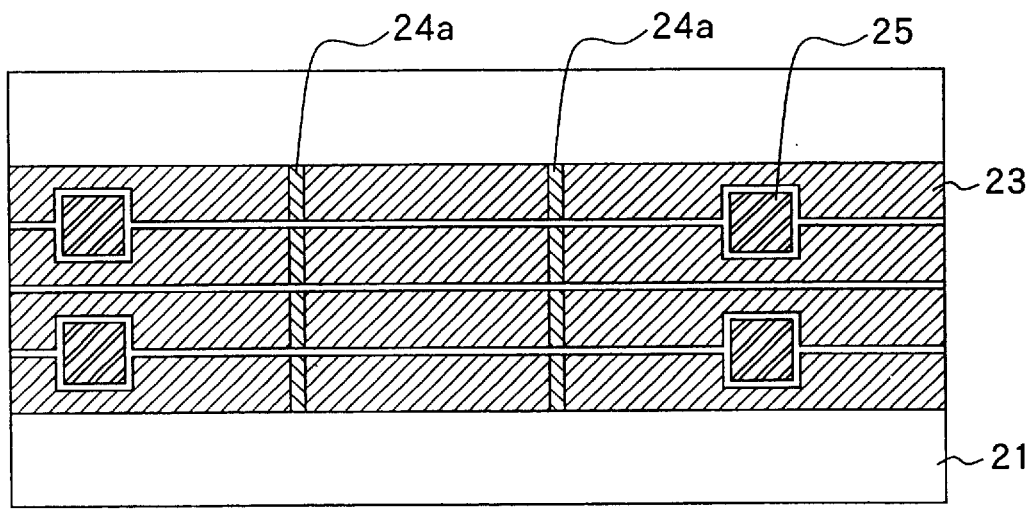
FIG. 21 is a plane view describing a step following to the step of FIG. 20.
Figure 22:
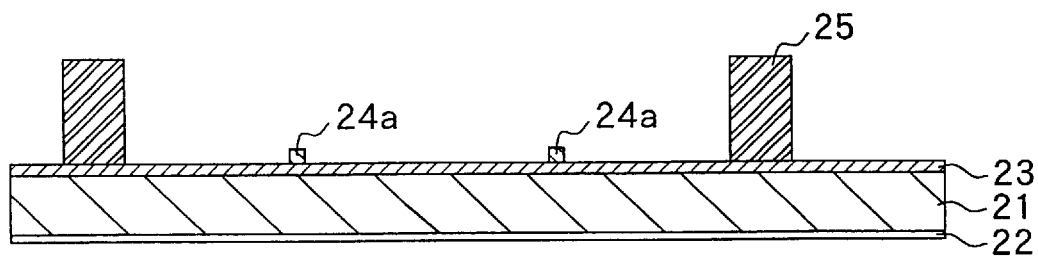
FIG. 22 is a cross sectional view describing a step following to the step of FIG. 21.

As shown in FIGS. 21 and 22, a polycrystalline silicon film having 2.2 $\mu$m thickness, for example, is formed. Then, the polycrystalline silicon film is patterned, thereby, the spacers 25 are formed between the upper substrate 11, on which the optical extraction units 17a are formed and the lower substrate 21, on which the lower transparent electrode is formed.

Figure 23:
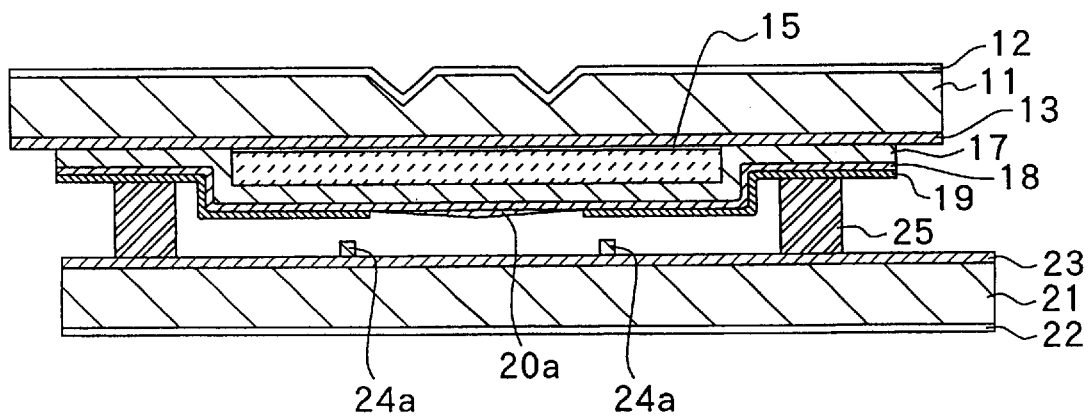
FIG. 23 is a cross sectional view describing a step following to the step of FIG. 22.

Finally, as shown in FIG. 23, with indium (In) as a joint layer, for example, the upper substrate 11 and the lower substrate 21 are joined with the spacers 25 in-between. This completes a series of processes, thereby achieving a plurality of optical switching element 10 arranged in linear.

In connection with this, measurement of the drawings used for explanation of the above-mentioned manufacturing processes is reduced for simplification. In full-sized measurement, the moving parts of the ribbon-like optical extraction units 17a measure 120 $\mu$m long, 12 $\mu$m wide, and a distance between the adjoined optical extraction units 17a measures 1 $\mu$m.

Next, operation of the optical switching element 10 relative to the present embodiment will be explained by referring FIGS. 24A and 24B.

An unillustrated transparent movable electrode formed on the thin ribbon-like optical extraction units 17a is grounded, thereby, electric potential is determined as 0V, and an unillustrated transparent electrode formed on the upper substrate 11 is applied 12V. This potential difference generates electrostatic attraction between the optical extraction units 17a and the upper substrate 11, thereby the optical extraction units 17a adhere to the upper substrate 11 (the first position) as shown in FIG. 24A. In this state, if incident light $P_1$ vertically enters an inclined face of the V-shaped trench 11a in the upper substrate 11, the incident light $P_1$ transmits the upper substrate 11, then enters the optical extraction units 17a, and is emitted from the tapered part 20a formed in the back of the optical extraction units 17a. Subsequently, the incident light $P_1$ passes through the lower substrate 21, which converts the incident light $P_1$ into transmission light $P_2$.

Figure 24A:
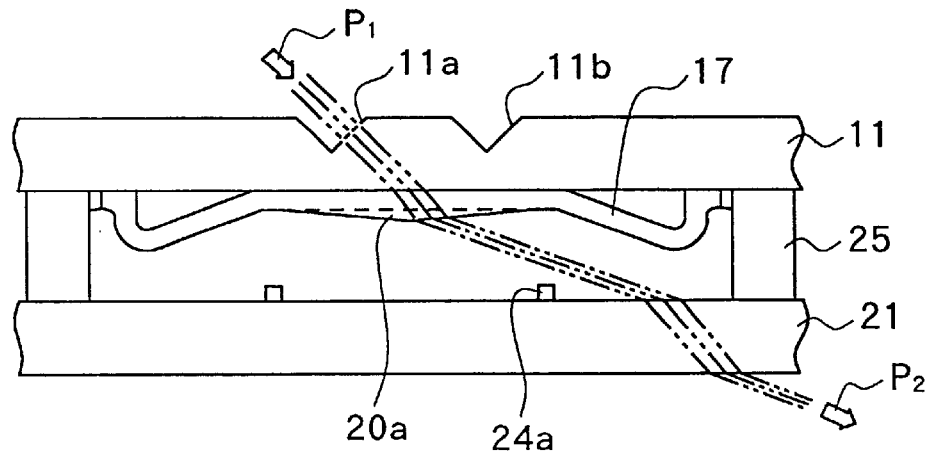
FIGS. 24A and 24B are cross sectional views describing operation of the optical switching apparatus in FIG. 7.
Figure 24B:
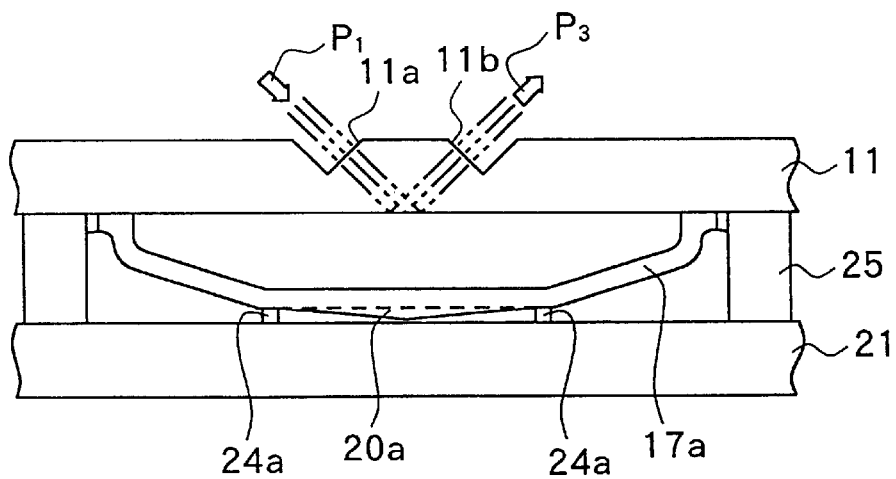

Following this, the optical extraction units 17a are removed from the upper substrate 11 as shown in FIG. 24B. In other words, the unillustrated transparent electrode formed on the upper substrate 11 is grounded, thereby, electric potential is determined as 0V. At this moment, the unillustrated transparent electrode formed on the lower substrate 21 is also applied +12V. This potential difference generates electrostatic attraction between the transparent electrode of the lower substrate 21 and the electrode on the optical extraction units 17a whose electric potential is 0V, thereby attracting the optical extraction units 17a to the lower substrate 21 side. In this moment, the optical extraction units 17a stop in a position where the optical extraction units 17a contact the spacers 24a on the lower substrate 21 (the second position). In this state, the incident light $P_1$ causes the total reflection on the lower side of the upper substrate 11 (the total reflection face 11A) and is converted into total reflection light $P_3$ and emitted from the V-shaped trench 11b processed as different from the incident part of the light.

As described above, in the present embodiment, the incident light $P_1$ can be converted into two ways: the transmission light $P_2$ and the total reflection light $P_3$. Additionally, in the optical switching element 10, the optical extraction units 17a are only movable parts, and a distance in which the optical extraction units 17a must move, is about one wavelength of the incident light at the maximum, which attains rapid switching movement. The electrodes can be formed on and beneath the optical extraction units 17a functioning as the movable parts, which gains fast response regardless of mechanical resonance frequency. Further, one optical extraction unit 17a is enough for one channel optical switching element, which enables miniaturization. An advantage of such miniaturization is particularly worth being used in the case that the optical extraction unit becomes linear array for display-use.

In the present embodiment, with respect to the incident light $P_1$, the both of the total reflection light $P_3$ from the total reflection face 11A of the upper substrate 11 and the transmission light $P_2$ transmitted the optical extraction units 17a can be used or either one of the two light can be used. In the case that the both of the transmission light $P_2$ and the total reflection light $P_3$ can be used, such light can be used as a two-way optical deflection element having less mixture. In the case that total reflection light $P_3$ can be only used, the switching element having high optical effectiveness can be comprised. A specific configuration in the case where either one of the light will be described herein after.

Meanwhile, in the optical switching element 10 using the total reflection member like this, the incident light $P_1$ is required to enter the total reflection face 11A at an angle satisfying the total reflection condition. In other words, in the case that one side of the upper substrate 11 is used as the total reflection face, if the both faces of the glass substrate are parallel, light can not enter at the angle satisfying the total reflection condition (a critical angle).

Compared with this, in the present embodiment, the light can enter at an incident angle which is a critical angle or greater by processing the V-shaped trench 11a with etching, molding, or mechanical processing performed on the upper substrate 11. With a like manner, the V-shaped trench 11b is similarly processed in the emission part of the total reflection light $P_3$ in the upper substrate 11 for preventing the total reflection light $P_3$ from causing the total reflection again on the surface of the upper substrate 11. Therefore, in the present embodiment, the incident light $P_1$ can be effectively converted into the total reflection light $P_3$.

Instead of processing the above-mentioned V-shaped trenches 11a and 11b, using a microprism covering the both incident part of light and the emission part of reflection light, or a microprism covering each of the incident part and the emission part respectively, the same effects can be expected. Alternatively, a cylindrical lens covering the incident part of light and the emission part of reflection light and whose center is positioned in the total reflection face, can be used instead of using such microprisms. Specific examples of these will be described as modifications hereinafter.

In the present embodiment, in the case that light is extracted with a manner such that the optical extraction units 17a contact the total reflection face 11A of the upper substrate 11 or are disposed closed to the total reflection face 11A with an interval small enough to extract near-field light, how to process extraction light in the optical extraction units 17a brings trouble. In other words, if a face oppose to the optical extraction face of the optical extraction units 17a remains parallel without any processing, light is not emitted from the face, but causes the total reflection, thereby failing to function as the optical switching element. Therefore, in the present embodiment, with the tapered part 20a inclined at an angle in a manner that the incident angle of light becomes smaller than the critical angle is formed with etching the face oppose to the optical extraction face of the optical extraction units 17a, which enables light to be emitted therefrom.

Thereby, in the optical switching element 10, the incident light $P_1$ can be converted into the transmission light $P_2$ from the light extraction units 17a and into the total reflection light $P_3$ from the upper substrate 11. In the case of using the optical switching element 10 as an optical switching element only employing the total reflection light $P_3$, an absorption layer is provided on the face oppose to the optical extraction face of the optical extraction units 17a, which attains optical switching in only one way (See FIG. 30).

Figure 28A:
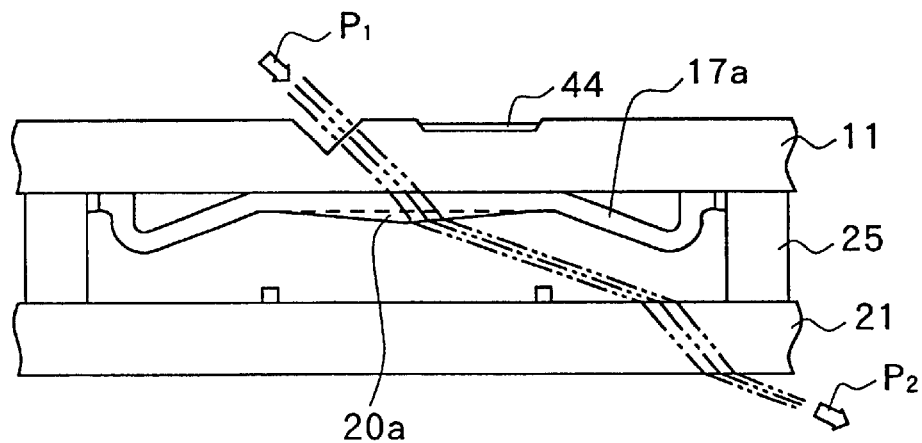
FIGS. 28A and 28B are cross sectional views describing another modification of the optical switching apparatus in FIG. 7.
Figure 28B:
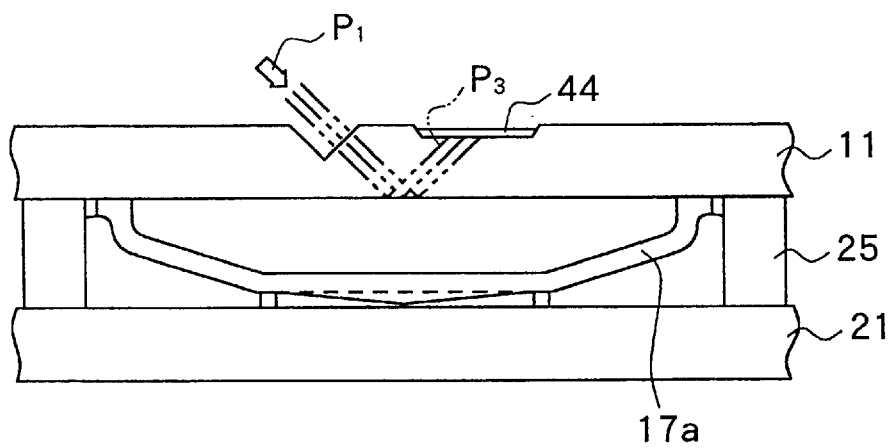
Figure 29A:
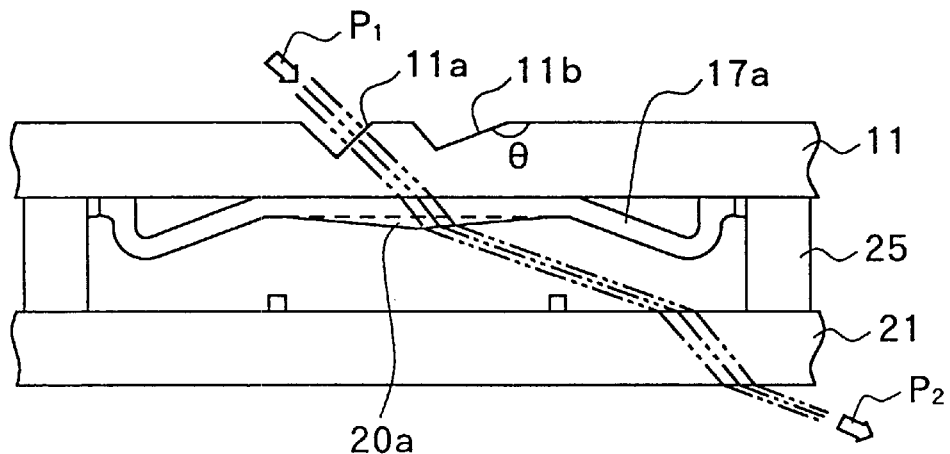
FIGS. 29A and 29B are cross sectional views describing another modification of the optical switching apparatus in FIG. 7.
Figure 29B:
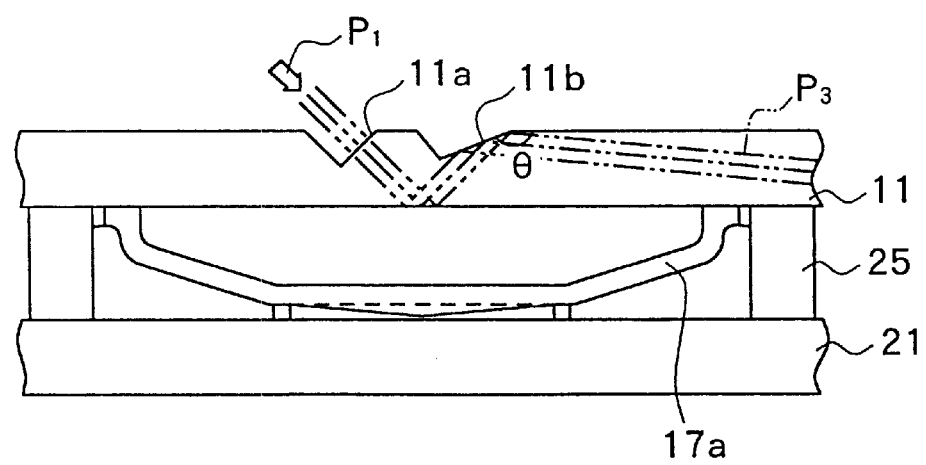

On the other hand, in the case of using as an optical switching element only employing the transmission light $P_2$ from the optical extraction units 17a, the emission part of the upper substrate 11 from which the total reflection light $P_3$ is emitted, remains parallel without processing the V-shaped trench, or an angle at which the total reflection causes, is processed on that emission part, thereby the reflection light is not emitted from the upper substrate 11 because of again causing the total reflection, and can be guided to a direction parallel to the upper substrate 11 therein (See FIG. 29). However, in the case of the above-mentioned structure, careful operation is required because the light may be attenuated or leaked, which is caused by the influence of the structure produced on the substrates and of the stacked layers. With the same manner, in the case of using the optical switching element 10 as an optical switching element only employing the transmission light $P_2$ from the optical extraction units 17a, an absorption layer is provided instead of processing the V-shaped trench in the emission part of the upper substrate 11 from which the total reflection light $P_3$ is emitted, thereby enabling the emission light emitted from the upper substrate 11 to be absorbed (See FIG. 28).

In the present embodiment, the movable parts are only the thin ribbon-like optical extraction units 17a, which realizes small and lightweight. Thereby strong force is not required to drive, but electrostatic attraction is sufficient. In this moment, as electrodes generating electrostatic attraction, transparent electrodes can be provided in the total reflection light face 11A and the optical extraction units 17a, or an opaque conducting film such as an aluminum (Al) film formed in a manner of excluding parts in which the light transmits, can be also used. The transparent electrodes or an opaque electrode formed in a manner of only excluding the parts in which the light transmits, can be used with a reason of keeping a total reflection mirror apart from the optical extraction units while the switching is not conducted for preventing the optical extract units 17a from sticking to the total reflection face 11A of the upper substrate 11, and achieving rapid driving.

As for the optical switching element such that the incident light $P_1$ is only converted into the total reflection light $P_3$, in the case that the absorption layer is provided on the opposite face to the optical extraction face of the optical extraction units 17a, the lower substrate 21 including no total reflection face is unnecessary to composed of a glass substrate, but may be composed of silicon (Si) substrate. Needless to say, in this case, it is also unnecessary to use the transparent electrodes or to form the opaque electrode in a manner of only excluding the parts in which the light transmits.

[Modification]

Modifications of the above-mentioned embodiment will be described by referring FIGS. 25 to 31. The same configurations as the above-mentioned embodiment has the same reference numerals, and the detailed explanations are omitted. Basic structures and effects are the same as the above-mentioned embodiment; therefore, different structures and effects will be only explained hereinafter.

With reference to FIGS. 25 to 31, each of drawings shows the optical switching element employing the total reflection light in the upper substrate 11 and the transmission light in the optical extraction units 17a. FIG. 28 shows an optical switching element only employing the transmission light. FIG. 29 shows a switching element only employing the transmission light basically, but capable of employing the total reflection light. FIGS. 30 and 31 respectively shows switching elements only employing the total reflection light.

[Modification 1]

Figure 25A:
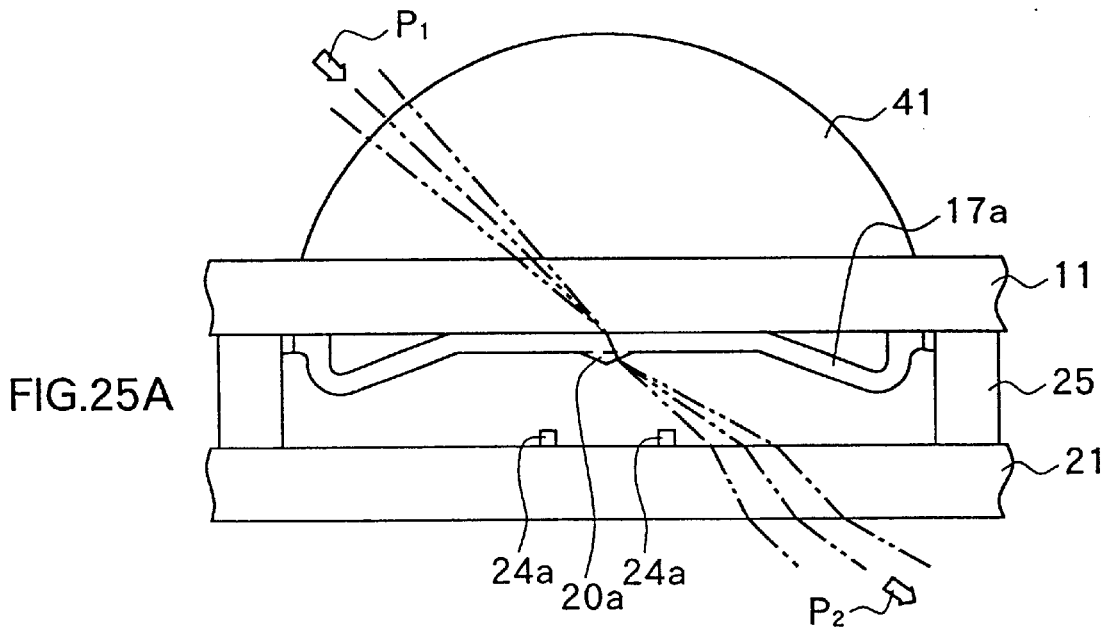
FIGS. 25A and 25B are cross sectional views describing a modification of the optical switching apparatus in FIG. 7.
Figure 25B:
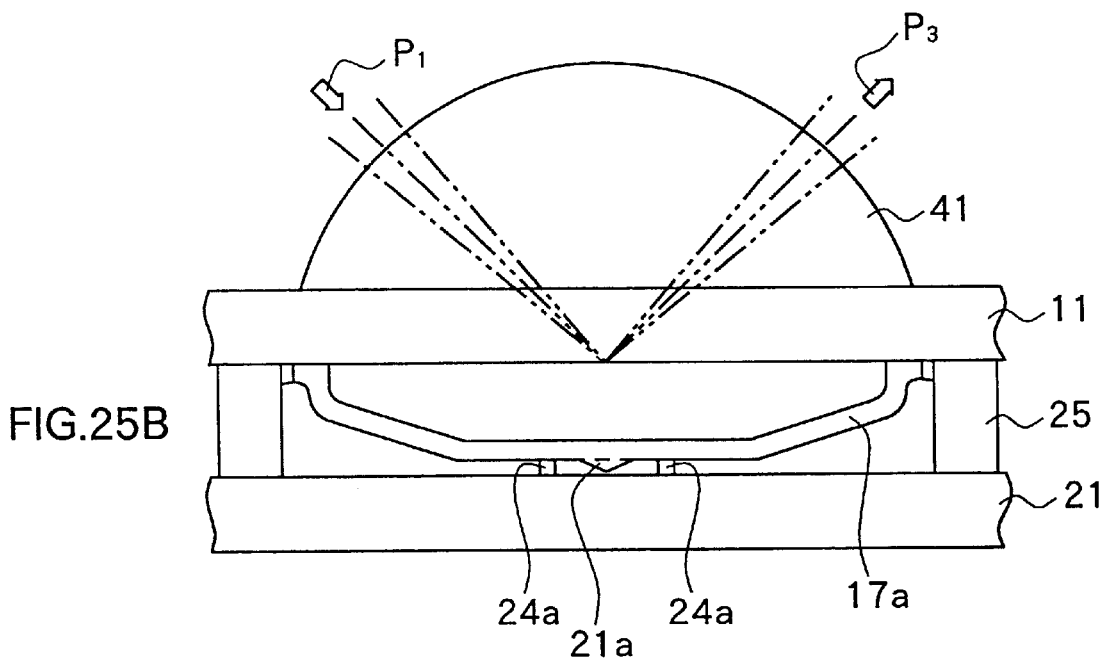

In the optical switching element shown in FIGS. 25A and 25B, instead of the V-shaped trenches 11a and 11b shown in FIGS. 24A and 24B, which allows the light $P_1$ to enter the lower face of the upper substrate 11 at an angle capable of causing the total reflection light, a cylindrical lens 41 whose center is positioned in the lower face of the upper substrate 11, is used. In the optical switching element, the light $P_1$ can enter the lower face of the upper substrate 11 at the angle capable of causing the total reflection. However, it is necessary to set the angle and size of the tapered part 20a formed on the optical extraction units 17a different from those with the case shown in FIGS. 24A and 24B.

[Modification 2]

Figure 26A:
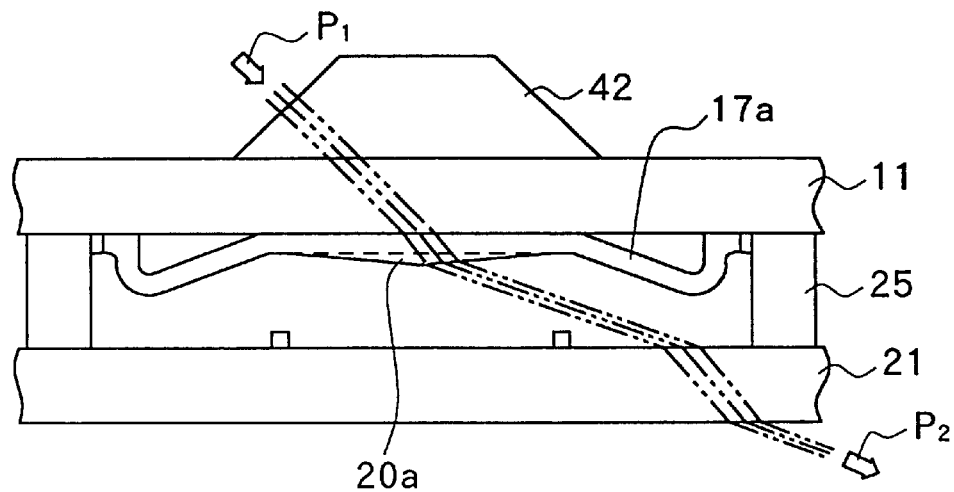
FIGS. 26A and 26B are cross sectional views describing another modification of the optical switching apparatus in FIG. 7.
Figure 26B:
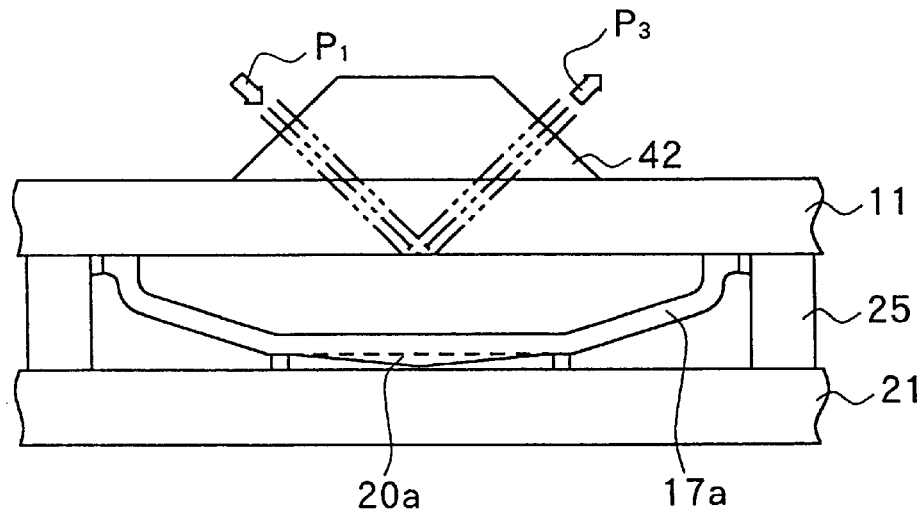

In the optical switching element shown in FIG. 26A and 26B, instead of the V-shaped trenches 11a and 11b shown in FIGS. 24A and 24B, a microprism 42 whose cross section is an isosceles trapezoid shape, is used. As long as the incident angle of the light is the same as in FIGS. 24A and 24B, and inclined faces in the trapezoid-shaped cross section is orthogonal to the incident angle of the light (in other words, if the inclined angles of the V-shaped trenches 11a and 11b shown in FIGS. 24A and 24B are the same as the inclined angles of the trapezoid-shaped cross section), other structures such as the optical extraction units 17a except the upper substrate 11 can be the same as in FIGS. 24A and 24B.

Figure 27A:
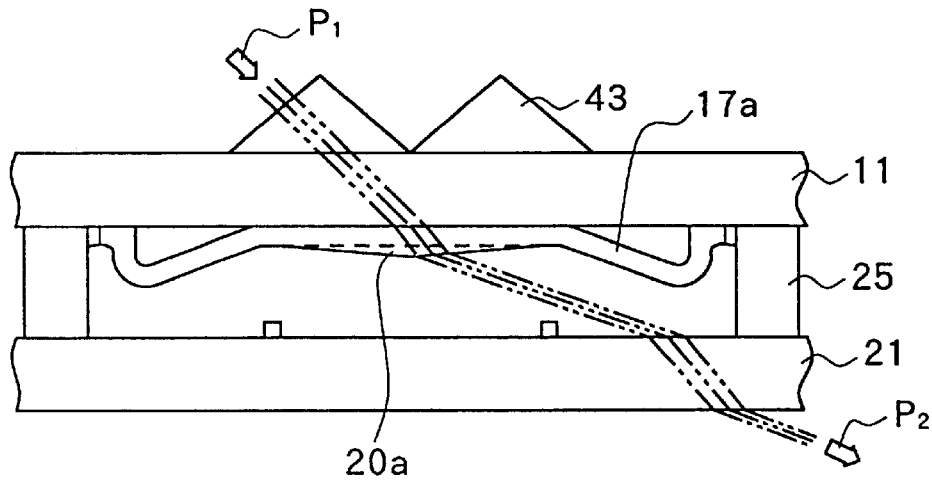
FIGS. 27A and 27B are cross sectional views describing another modification of the optical switching apparatus in FIG. 7.
Figure 27B:
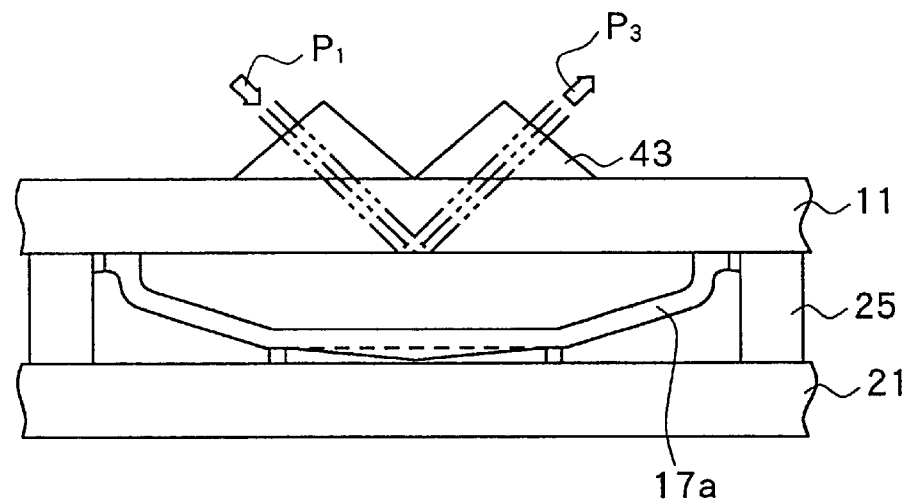

In the optical switching element shown in FIGS. 27A and 27B, instead of the V-shaped trenches 11a and 11b shown in FIGS. 24A and 24B, microprisms 43 whose cross sections are an isosceles triangle shape, are respectively used in the incident part of the light and the emission part of the total reflection light. With a similar manner as FIGS. 26A and 26B, if the incident angle of the light is the same as in FIGS. 24A and 24B, and a base angle of the isosceles triangle-shaped cross sections is orthogonal to the incident angle of the light, (in other words, the inclined angles of the V-shaped trenches 11a and 11b shown in FIGS. 24A and 24B are equal to the base angle of the isosceles triangle-shaped cross sections), other structures such as the optical extraction units 17a except the upper substrate 11 are the same as in FIGS. 24A and 24B.

In an optical switching element shown in FIG. 28A and 28B, instead of the V-shaped trench 11B in the emission part of the upper substrate 11 shown in FIGS. 24A and 24B, an absorption layer 44 is provided. The absorption layer 44 absorbs the total reflection light $P_3$ reflected from the bottom of the upper substrate 11, so that the transmission light $P_2$ from the optical extraction units 17a can be only used.

In an optical switching element shown in FIG. 29, an angle θ which the V-shaped trench 11b in the emission part of the upper substrate 11 forms with the upper face of the substrate 11 is determined as an angle which the total reflection light $P_3$ advances in almost parallel to the upper face of the substrate inside the substrate unlike the V-shaped trench 11a in the incident part. For instance, in the case that the incident angle of the incident light $P_1$ relative to the upper substrate 11 is determined as 45°, θ satisfies 157.7°. Thereby, the total reflection light $P_3$ from the lower face of the upper substrate 11 causes the total reflection on the V-shaped trench 11b again and guided inside the upper substrate 11 to the outside therefrom. The above-mentioned light may be absorbed by ends of the substrate or the outside of the substrate, or used as light, which is conducted switching. However, in the case that a variety of structures is produced on the upper substrate 11, if the light enters that part, the light is turned into noise, or attenuated, so that light is needed to be treated carefully.

Figure 30A:
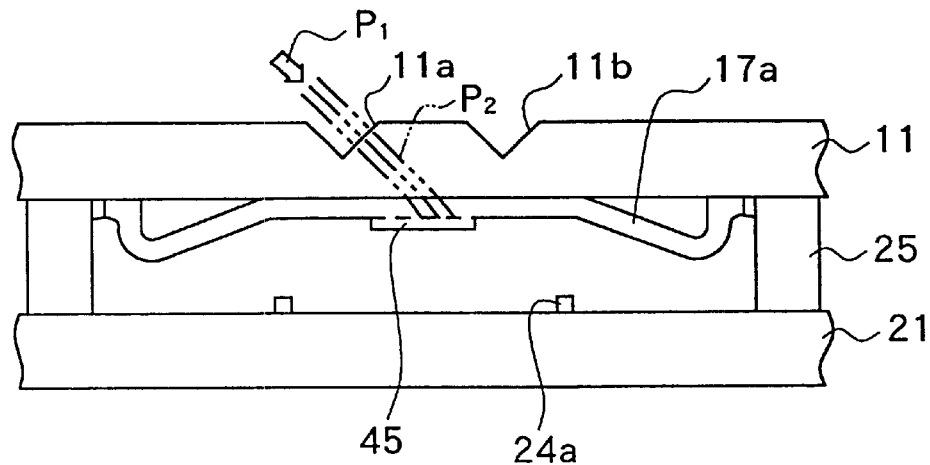
FIGS. 30A and 30B are cross sectional views describing another modification of the optical switching apparatus in FIG. 7.
Figure 30B:
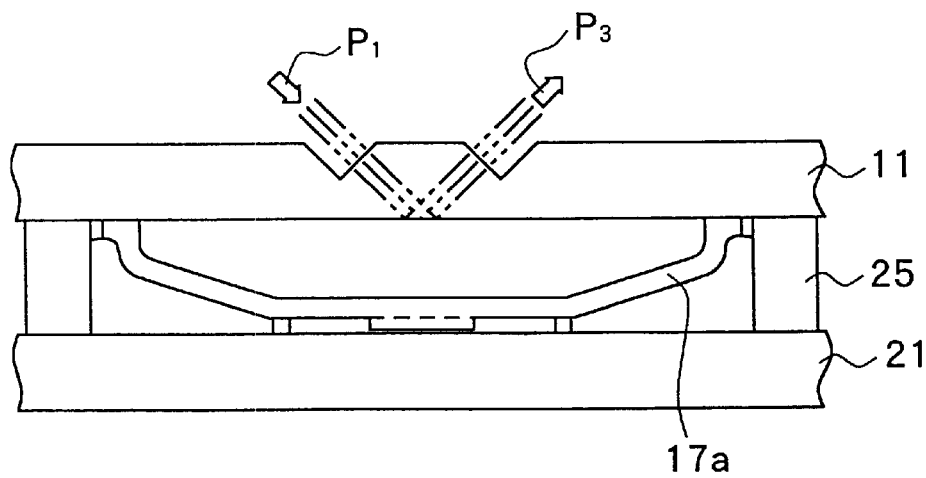

In an optical switching element shown in FIGS. 30A and 30B, instead of the tapered part 20a formed on the optical extraction units 17a in FIGS. 24A and 24B, an absorption layer 45 is formed. The absorption layer 45 absorbs the light $P_2$ transmitted through the upper substrate 11 to the optical extraction units 17a, thus, only the total reflection light $P_3$ is utilized in the optical switching element. Needless to say, in the above-mentioned optical switching element, it is unnecessary to provided the tapered part in the optical extraction units 17a.

Figure 31A:
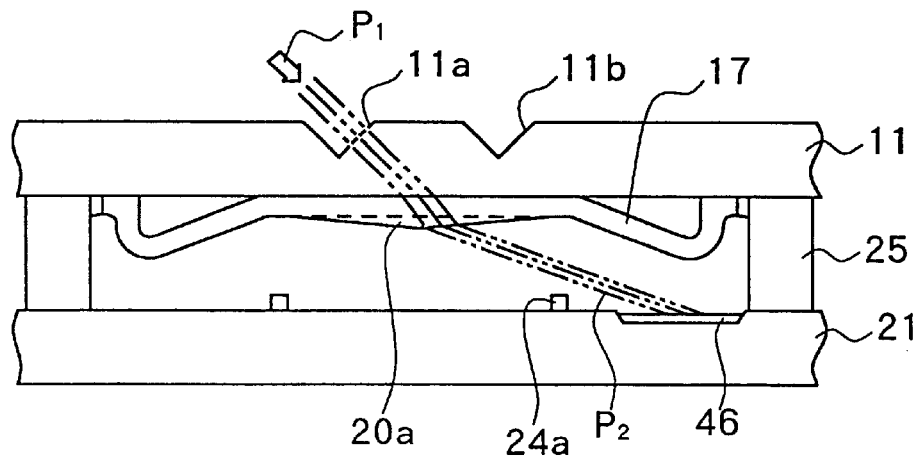
FIG. 31A and 31B are cross sectional views describing another modification of the optical switching apparatus in FIG. 7.
Figure 31B:
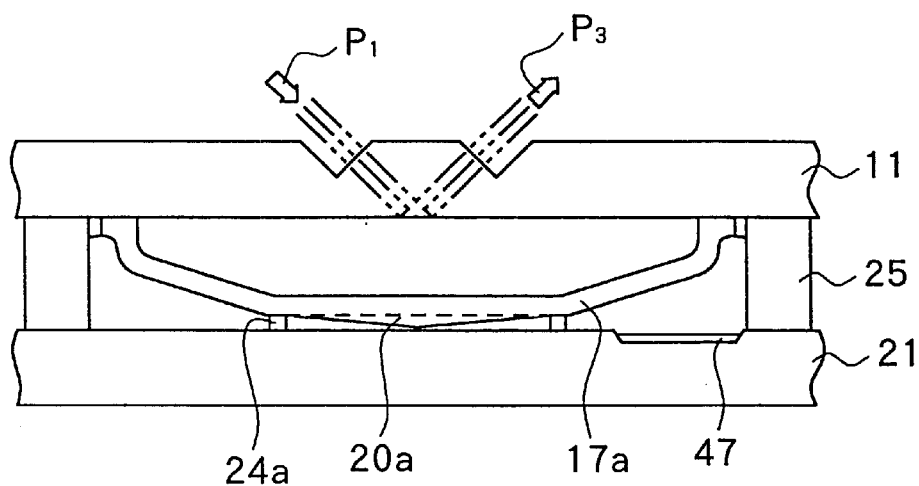

In an optical switching element shown in FIGS. 31A and 31B, an absorption layer 46 is formed in a part, in which light $P_2$ transmitted the optical extraction units 17a on the lower substrate 21 reflects. This provides the optical switching element for which the total reflection light $P_3$ is only used.

As has been described in the above modifications, the absorption layer is used not only with the V-shaped trench but also with the microprism or cylindrical lens.

[Image display apparatus]

Figure 32:
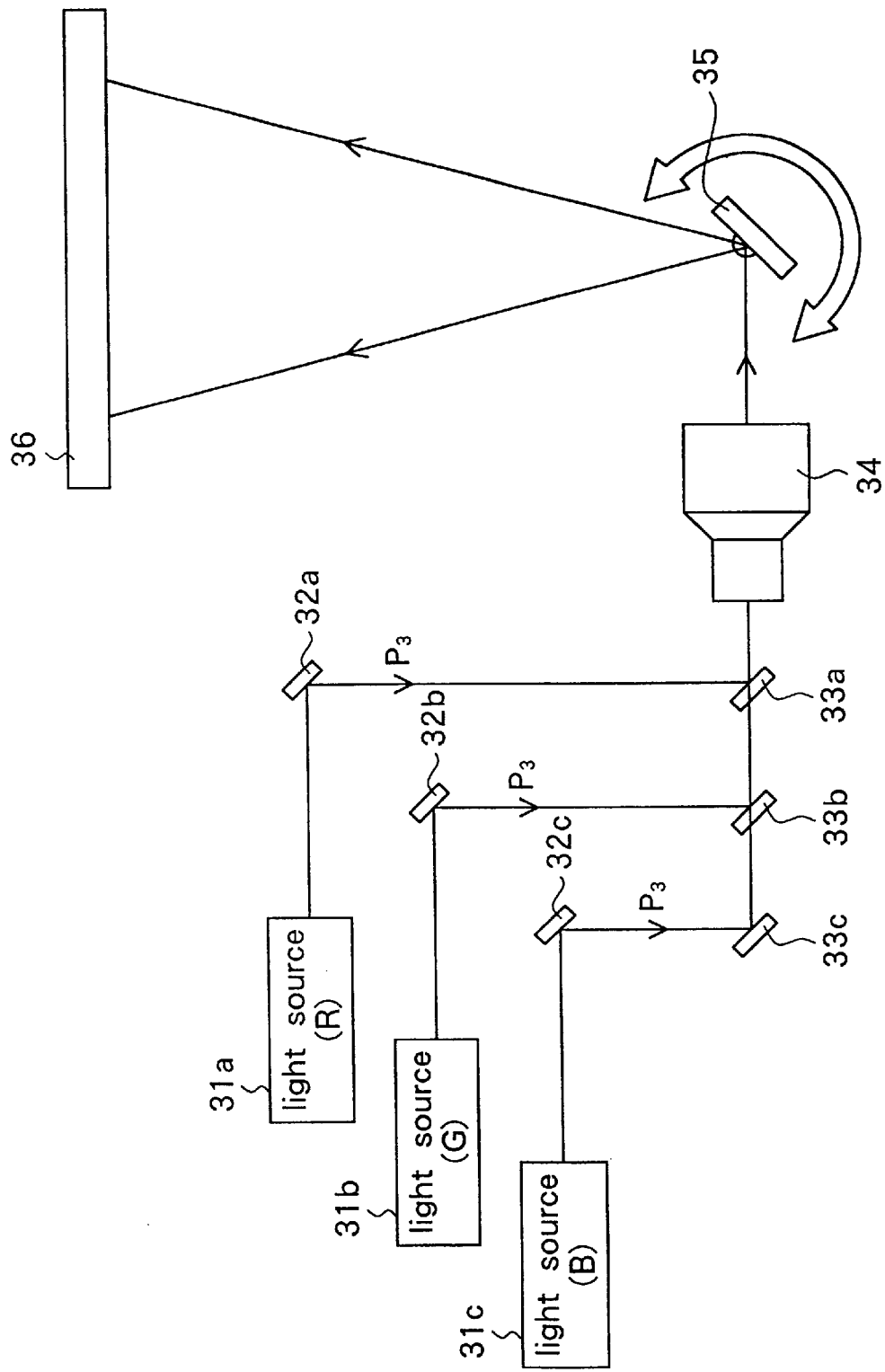
FIG. 32 is a view showing a configuration of an display applying to the optical switching apparatus in FIG. 7.

FIG. 32 is a view showing a configuration of a projection display as an example of the image display apparatus using the above-mentioned switching element 10 or the switching apparatus 1. Here, described is a case when the total reflection light $P_3$ from the switching element 10 is employed in the image display. The transmission light $P_2$ from the optical extraction units 17a may be also employed.

The projection display is provided with light sources 31a, 31b, 31c whose colors are respectively red (R), green (G), blue (B), switching element arrays 32a, 32b, 32c, mirrors 33a, 33b, 33c, a projection lens 34, a galvano-mirror 35 functioning as a uniaxial scanner, and a screen 36. As the light sources 31a, 31b, and 31c for R G B color, there are several methods: the method such that R G B color lasers are employed and the method such that R G B light is produced with a white light source employing a dichroic mirror or a color filter. In connection with this, three primary colors may be cyan, magenta, yellow besides red, green and blue. The switching element arrays 32a, 32b and 32c are respectively configured such that a plurality of the above-mentioned switching elements 10, say 1000 pieces, is arranged linearly in a vertical direction relative to the paper.

In the projection display, light emitted from the light sources 31a, 31b, and 31c for R G B color enters the optical switching element arrays 32a, 32b and 32c. The total reflection light $P_3$ from each of the optical switching elements 10 is converged in the projection lens 34 with the mirror 33a, 33b, and 33c. The light converged in the projection lens 34 is scanned with the galvano-mirror 35, and then, projected on the screen 36 as an two-dimensional image.

As described above, in the projection display, a plurality of the optical switching elements 10 is linearly arranged and irradiated light of R, G, and B, and the light after switching is scanned with the uniaxial scanner, thus, two-dimensional image is displayed. Here, high-speed switching of the optical switching element 10 is carried out as described above, thereby obtaining high accuracy in gradation indication with digital control in time division.

For the reason that response speed of the optical switching element 10 is fast enough, single optical switching element linear array is employed for each of the colors R, G, and B, light of R, G, and B is irradiated by switching with respect to the optical switching element linear array, which achieves collar image display.

Although the present invention was described by referring the embodiment and modifications, it is not limited to the embodiment and varies modifications are possible. For example, although in the above-mentioned embodiment, the optical switching apparatus 1 has the structure such that the optical switching element 10 is linearly arranged, it may be arranged in two dimension. In the above-mentioned embodiment, the example in which the optical switching element of the present invention is employed as a display, was described, however, the present invention may be applied to various devices such as an optical communication apparatus, an optical storage apparatus, an optical printer and so on.

According to the optical switching element or the optical switching apparatus of the present invention, the total reflection unit having the total reflection face capable of causing the total reflection of the incident light, a translucent optical extraction unit capable of switching in either a first position or a second position, are provided, wherein the first position is a position where the optical extraction unit contacts the total reflection face of the total reflection member or a position where the optical extraction unit are disposed close to the total reflection face with an interval small enough to extract near-field light and the second position is a position where the optical extraction unit is disposed with an interval greater than the interval with which the near-field light is extracted, thereby enabling fast response.

According to the image display apparatus of the present invention, the optical switching element of the present invention is linearly arranged, then, three primary colors are irradiated to the optical switching apparatus having the linear array structure and scans with the uniaxial scanner, thereby gaining display of the two-dimensional image, and high accuracy in gradation indication. This obtains image in excellent quality and miniaturization.

Obviously many modifications and variations of the present invention are possible in the light of the above teachings. It is therefore to be understood that within the scope of the appended claims the invention may be practiced otherwise than as specifically described.

What is claimed is:

1. An optical switching element comprising:
a total reflection member having a total reflection face capable of causing the total reflection of incident light; and
a translucent optical extraction unit capable of switching in either a first position or a second position, said translucent optical extraction unit switching between said first and second positions based upon a voltage difference between electrodes coupled to said total reflection member and said translucent optical extraction unit,
wherein the first position is a position where the optical extraction unit contacts the total reflection face of the total reflection member or a position where the optical extraction unit is disposed close to the total reflection face With an interval small enough to extract near-field light and the second position is a position where the optical extraction unit is disposed with an interval greater than the interval with which the near-field light is extracted.

2. An optical switching element according to claim 1 comprises a driving means for switching the optical extraction unit in either the first position or the second position in accord with a guiding direction of the incident light.

3. An optical switching element according to claim 1, wherein when the optical extraction unit is in the second position, reflection light reflected from the total reflection face of the total reflection member is used.

4. An optical switching element according to claim 1, wherein when the optical extraction unit is in the first position, light transmitted through the total reflection member and the optical extraction unit is used.

5. An optical switching element according to claim 1, wherein total reflection light reflected from the total reflection member and the transmission light transmitted through the optical extraction unit are used as an optical deflection element in two ways.

6. An optical switching element according to claim 2, wherein the total reflection member is a translucent substrate having a pair of parallel faces, one face is an incident face, the other face is a total reflection face when the optical extraction unit is in the second position, or is an emission face when the optical extraction unit is in the first position.

7. An optical switching element according to claim 6, wherein a pair of V-shaped trenches provides in the incident face of the translucent substrate, the incident light is guided to the total reflection face in one V-shaped trench, the reflection light from the total reflection face is guided to the outside in the other V-shaped trench.

8. An optical switching element according to claim 6, wherein a microprism is provided in the incident face side of the translucent substrate;
wherein the microprism functions as a guiding part of the incident light and an emission part of the reflection light from the total reflection face.

9. An optical switching element according to claim 6, wherein a micro cylindrical lens is provided in the incident face side from the translucent substrate;
wherein the micro cylindrical lens is a guiding part of the incident light and an emission part of the reflection light of the total reflection face.

10. An optical switching element according to claim 1, wherein the optical extraction unit is a board-like translucent substrate having a bridged structure.

11. An optical switching element according to claim 1, wherein a total reflection prevention unit is provided in a face oppose to the total reflection member side of the optical extraction unit;
wherein the reflection preventing unit is for preventing the total reflection light of the incident light transmitted through the total reflection member in the optical extraction unit when the optical extraction unit is in the first position.

12. An optical switching element according to claim 11, wherein the reflection preventing unit is a translucent tapered part having an angle which the total reflection is not caused, and guiding the incident light in a direction oppose to the total reflection member side.

13. An optical switching element according to claim 11, wherein the total reflection preventing unit is an absorption layer, which absorbs the incident light.

14. An optical switching element according to claim 6, a total-reflection-light absorption layer, which absorbs the reflection light reflected from the total reflection face, is provided in the incident face side of the translucent substrate.

15. An optical switching element according to claim 6, wherein the translucent substrate has a total reflection unit, which guides the reflection light from the total reflection face to an edge direction by causing the repeated total reflection inside the translucent substrate, and deflects the light into two directions in which the edge direction of the translucent substrate and a transmission direction of the optical extraction unit.

16. An optical switching element according to claim 1, wherein the driving means has a pair of transparent electrodes disposed in a position oppose to the reflection face of the total reflection member and the optical extraction unit in a manner of facing each of the transparent electrodes, and a voltage applying means for applying voltage to the pair of the transparent electrodes, wherein the optical extraction unit is driven by electrostatic attraction generated by potential difference between the pair of the transparent electrodes.

17. An optical switching element according to claim 6, wherein other translucent substrate facing the total reflection member and emission light from the optical extraction unit entering therein, is provided in a position oppose to the translucent substrate of the optical extraction unit.

18. An optical switching element according to claim 17, an absorption layer, which absorbs the emission light from the optical extraction unit, is provided in the incident face side of the other translucent substrate.

19. An optical switching element according to claim 17, the driving means is provided with three transparent electrodes respectively disposed in the total reflection face of the total reflection member, the optical extraction unit and a position oppose to the optical extraction unit of other translucent substrate in a manner of facing each of the transparent electrodes, and a voltage applying means for applying voltage to the three transparent electrodes, wherein the optical extraction unit is driven by electrostatic attraction generated by potential difference among the transparent electrodes.

20. A switching apparatus comprises a plurality of optical switching elements, wherein the optical switching elements has a total reflection member having a total reflection face capable of causing the total reflection of incident light and a translucent optical extraction unit capable of switching in either a first position or a second position, said translucent optical extraction unit switching between said first and second positions based upon a voltage difference between electrodes coupled to said total reflection member and said translucent optical extraction unit;

wherein the first position is a position where the optical extraction unit contracts the total reflection face of the total reflection member or a position where the optical extraction unit is disposed close to the total reflection face with an interval small enough to extract near-field light and the second position is a position where the optical extraction unit is disposed with an interval greater than the interval with which the near-field light is extracted.

21. An image display apparatus displays two-dimensional image by irradiating three-primary colors to a plurality of optical switching elements and scanning with a scanner, wherein the optical switching elements are provided with a total reflection member having a total reflection face capable of causing the total reflection of incident light, and a translucent optical extraction unit capable of switching in either a first position or a second position said translucent optical extraction unit switching between said first and second positions based upon a voltage difference between electrodes coupled to said total reflection member and said translucent optical extraction unit;

wherein the first position is a position where the optical extraction unit contacts the total reflection face of the total reflection member or a position where the optical extraction unit is disposed close to the total reflection face with an interval small enough to extract near-field light and the second position is a position where the optical extraction unit is disposed with an interval greater than the interval with which the near-field light is extracted.

\* \* \* \* \*